United States Patent [19]

Tsuchiya et al.

[11] Patent Number: 5,065,168

[45] Date of Patent: Nov. 12, 1991

[54] HEAD DRIVING PULSE GENERATION CIRCUIT FOR THERMAL RECORDING APPARATUS

[75] Inventors: Michio Tsuchiya, Nagoya; Masaaki Terazawa, Ichinomiya, both of Japan

[73] Assignee: Brother Kogyo Kabushiki Kaisha, Japan

[21] Appl. No.: 497,210

[22] Filed: Mar. 22, 1990

[30] Foreign Application Priority Data

May 16, 1989 [JP] Japan .............................. 1-55928[U]

[51] Int. Cl.[5] .............................................. G01D 15/10
[52] U.S. Cl. ................................................ 346/76 PH
[58] Field of Search .................................... 346/76 PH

[56] References Cited

U.S. PATENT DOCUMENTS

| | | | |
|---|---|---|---|
| 3,577,137 | 5/1971 | Brennan, Jr. | 340/324 |
| 4,704,617 | 11/1987 | Sato et al. | 400/120 |
| 4,724,336 | 2/1988 | Ichikawa | 346/76 |

FOREIGN PATENT DOCUMENTS

| | | | |
|---|---|---|---|
| 0138767 | 10/1981 | Japan | 346/76 PH |
| 0030062 | 2/1987 | Japan | 346/76 PH |
| 0116168 | 5/1987 | Japan | 400/120 |

*Primary Examiner*—Benjamin R. Fuller
*Assistant Examiner*—Nancy Le
*Attorney, Agent, or Firm*—Oliff & Berridge

[57] ABSTRACT

Disclosed herein is a thermal recording apparatus used, in facsimile machines, printers, etc., comprising a thermal head, a driving circuit and a temperature compensation circuit. The head has heating resistors which, driven by the driving circuit, generate heat by which to thermally record images, characters and other information on a recording medium. The temperature compensation circuit, detecting thermal head temperatures, has a charging-discharging circuit whose output charging-discharging signal varies with the temperature detected. The compensation circuit also comprises a reference signal generation circuit and an output circuit, the reference signal generation circuit outputs a reference signal to the output circuit based on information by which to control the head temperature suitably under various internal and external conditions affecting the head temperature inside and apparatus. The output circuit acquires information on actual head temperatures from the charging-discharging signal. The circuit obtains information from the reference signal on the status of the apparatus and any external factors affecting it. Based on these types of information, the output circuit outputs a temperature compensation signal. The driving circuit drives the heating resistors according to the compensation signal.

18 Claims, 5 Drawing Sheets

HEAD DRIVING PULSE GENERATION CIRCUIT FOR THERMAL RECORDING APPARATUS

BACKGROUND OF THE INVENTION

1. Field of the Invention

The present invention relates to a thermal recording apparatus and, more particularly, to a pulse generation circuit of a thermal recording apparatus that allows facsimile machines, printers and other related devices to provide recordings thermally on sheets of thermosensitive paper.

2. Description of Related Art.

A thermal recording apparatus (also hereinafter referred to as a thermal printer), uses heat to make recordings of information on paper. Thermal characteristics such as the ambient temperature and the thermal head temperature significantly affect recording quality, particularly the thickness of printing. Thus, to obtain stable and high levels of recording requires temperature compensation to be carried out. To provide the compensation requires detecting the head temperature of the thermal printer by a temperature sensor. The temperature sensor usually includes an element such as a thermistor which has a specific temperature-resistance characteristic (this element is hereinafter also referred to as a heat sensitive resistor).

A typical circuit configuration for temperature compensation comprises a resistance (R) and a capacitor (C), constituting an RC charging-discharging circuit. A heat sensitive resistor, which may be a thermistor, is connected to this circuit to vary the charging-discharging waveform of the circuit. The thermistor is disposed on the thermal head. As the head temperature varies, so does the degree of resistance of the thermistor. Because thermistors become less resistant at higher temperatures and have higher levels of resistance at lower temperatures, the time constant for the RC charging-discharging waveform is smaller at higher temperatures and larger at lower temperatures. That is, the charging time required until the output voltage of the RC charging-discharging circuit reaches its threshold is longer when the thermal head temperature is lower and shorter when the head temperature is higher. Since the pulse duration of the output signal coming from the temperature compensation circuit is proportional to the charging time, the output signal coming from the temperature compensation circuit has pulses of longer duration when the thermal head bears lower temperatures, and has pulses of shorter duration when the head bears higher temperatures.

Given these constraints, when it is desired to vary the recording energy due to a change in recording speed, prior art temperature compensation circuits have been typically capable of outputting only one type of recording pulse at a certain temperature.

SUMMARY OF THE INVENTION

It is therefore a primary object of the present invention to provide a head driving pulse generation circuit of a thermal recording apparatus capable of performing optimal thermal head temperature compensation under diverse internal and external conditions, with the thermal head being compensated in temperature as stable, high levels of recording quality are maintained.

According to one aspect of the present invention, there is provided a thermal recording apparatus comprising a thermal head, a driving circuit and a temperature compensation circuit. The thermal head has at least one heating resistor that generates heat by which to record images, characters and other information onto a recording medium. The driving circuit is used to drive the at least one heating resistor. While the driving circuit is active, the temperature compensation circuit performs temperature compensation by detecting the temperature of the thermal head. The temperature compensation circuit comprises a charging-discharging circuit and an output circuit. The charging-discharging circuit outputs signals of different charging-discharging output waveforms in response to varying temperatures. The output circuit admits the output signal from the charging-discharging circuit along with a reference signal in order to output a temperature compensation signal accordingly. There is also provided a reference signal generation circuit that generates the reference signal. This circuit comprises a digital means and a digital-analog conversion means. The digital means outputs the reference signal as a suitably adjusted and controlled digital signal. The digital-analog conversion means converts the digital signal from the digital means into an analog signal.

In the above-described construction of the present invention, the reference signal generation circuit, with its digital means and digital-analog conversion means generates a suitable reference signal in response to external factors that may exist. The temperature compensation circuit, with its charging-discharging circuit and output circuit performs optimal temperature compensation based on the reference compensation signal and the output signal provided by the charging-discharging circuit to output a temperature compensation signal from its output circuit, thereby implementing high-quality recording on the recording medium.

In this manner, the thermal recording apparatus according to the present invention performs optimal thermal head temperature compensation for stable and high levels of recording while suitably addressing various internal and external factors that may affect the operation.

BRIEF DESCRIPTION OF THE DRAWINGS

The above and other objects, features and advantages of the present invention will become apparent from the following description of a preferred embodiment, taken in conjunction with the accompanying drawings in which.

DESCRIPTION OF THE PREFERRED EMBODIMENT

Figure 1:
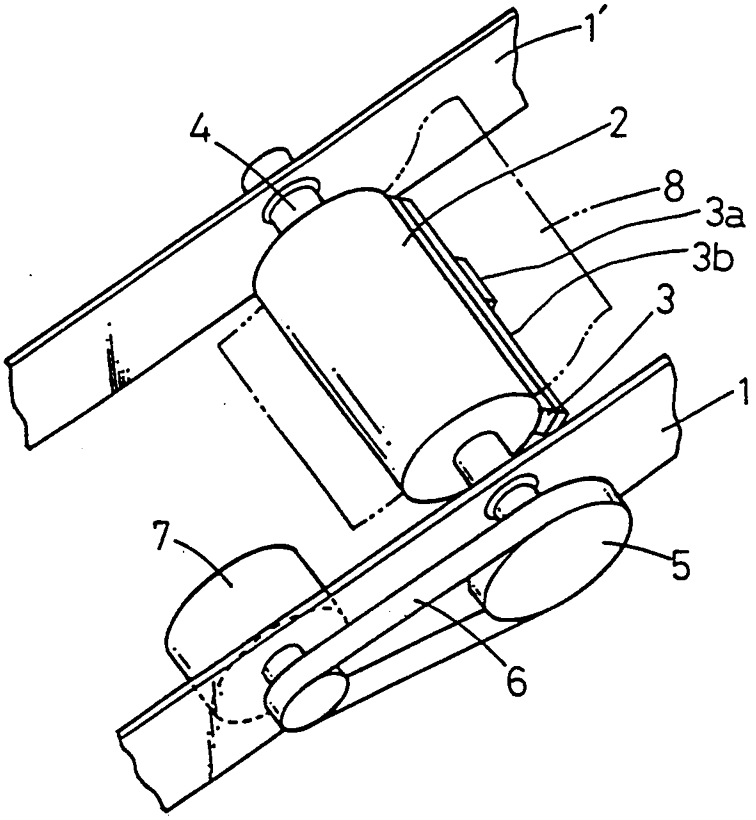
FIG. 1 is a perspective view of a thermal recording apparatus according to a preferred embodiment.

FIG. 1 shows a thermal recording apparatus according to the present invention A pair of opposing frames 1 and 1' are provided between which is erected a platen shaft 4. A platen 2 is attached to the platen shaft 4 which is equipped with a platen driving wheel 5. The driving wheel 5 is driven by a belt 6 engaged with a step motor 7 attached to the frame 1. Between the thermal head 3 and the platen 2 is arranged a thermosensitive sheet 8 that is fed perpendicular to the platen shaft 4 by rotation of the platen 2. The thermal head 3 is equipped with a thermistor 3*a*, which is a heat sensitive resistor that varies in its resistance in response to the thermal head temperature. The thermal head 3 also includes a heat sink 3*b* which functions to disperse heat from the heating resistors of the thermal head 3.

Figure 2:
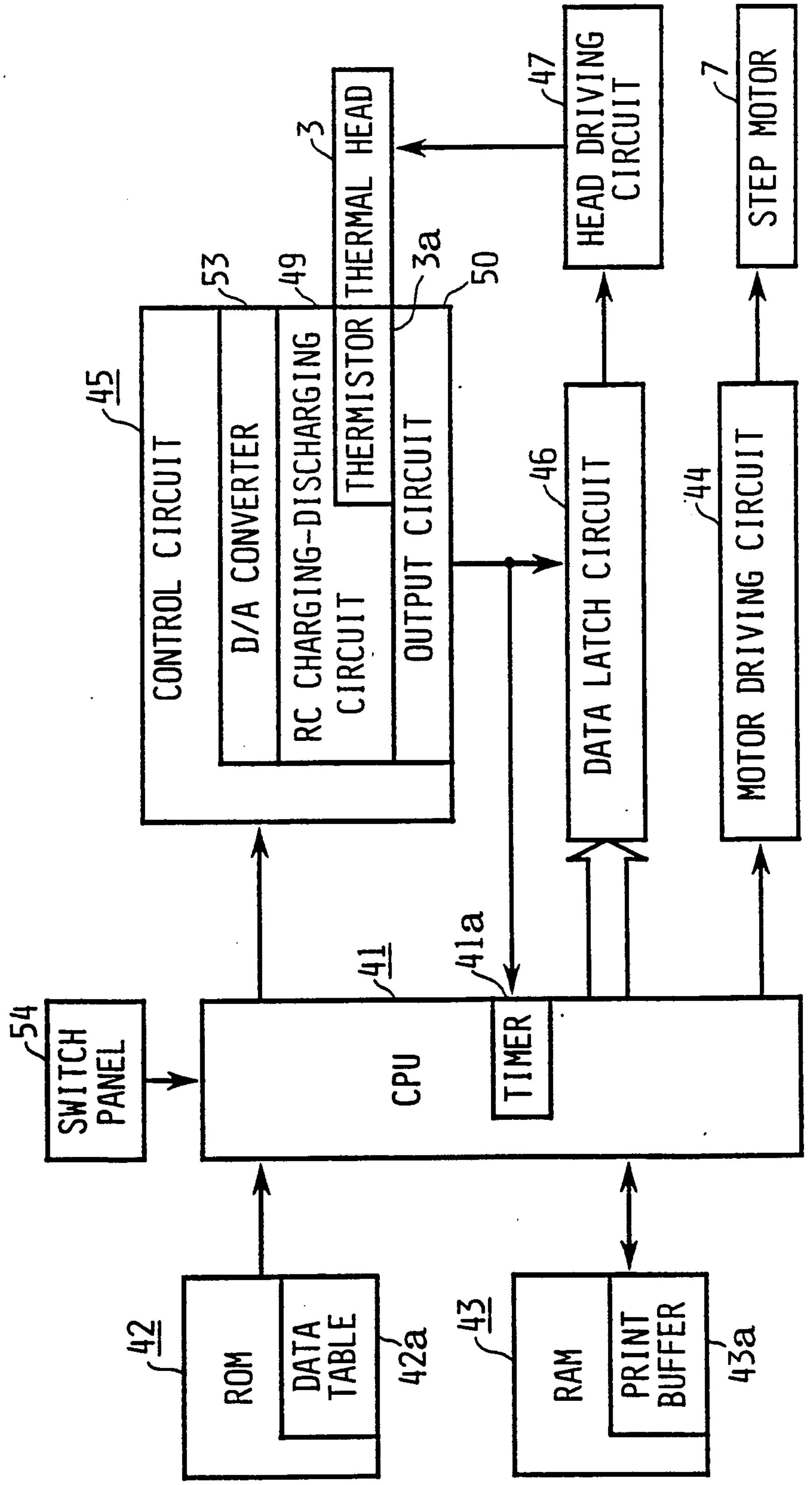
FIG. 2 is a block diagram of a control circuitry of the preferred embodiment.
Figure 3:
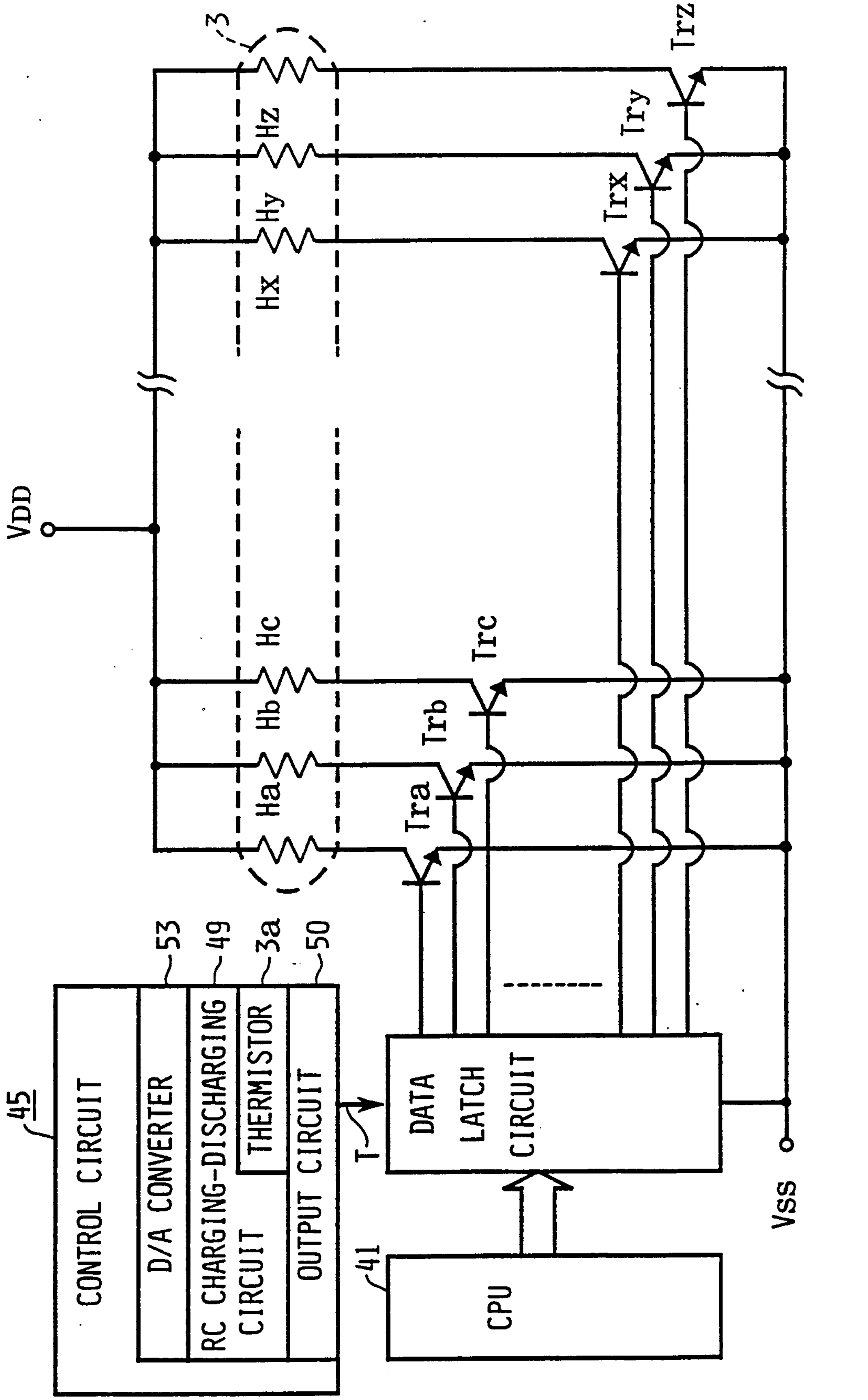
FIG. 3 is a schematic circuit diagram of a printing head and its nearby components.

There will now be described an electrical construction of the preferred embodiment by referring to FIGS. 2 and 3. A central processing unit (CPU) 41 that controls the thermal recording apparatus is connected to a ROM 42 and a RAM 43. The ROM 42 stores programs for controlling the apparatus and is equipped inside with data tables 42*a* to be described later. The RAM 43 functions as a work memory for operating the apparatus and contains image information for use thereby. The RAM 43 also includes a print buffer 43*a* which receives and temporarily stores data to be printed by thermal head 3. Data to be printed is inputted to print buffer 43*a* by, for example, a keyboard or an external computer and retrieved therefrom by CPU 41 for printing by thermal head 3. The CPU 41 is further connected to a motor driving circuit 44, a control circuit 45 and a data latch circuit 46. The driving circuit 44 drives the step motor 7. The control circuit 45 and the data latch circuit 46 are used to heat up heating elements Ha through Hz (FIG. 3) of the thermal head 3 in accordance with image information. The control circuit 45 is in turn connected to the data latch circuit 46 for control thereof. The data latch circuit 46 is connected to a head driving circuit 47 that has driving transistors Tra through Trz for heating up the heating elements Ha through Hz. The control circuit 45 comprises a temperature compensation circuit which, with the driving circuit 47 operating, detects the temperature of the thermal head 3 to perform temperature compensation thereof.

Figure 4:
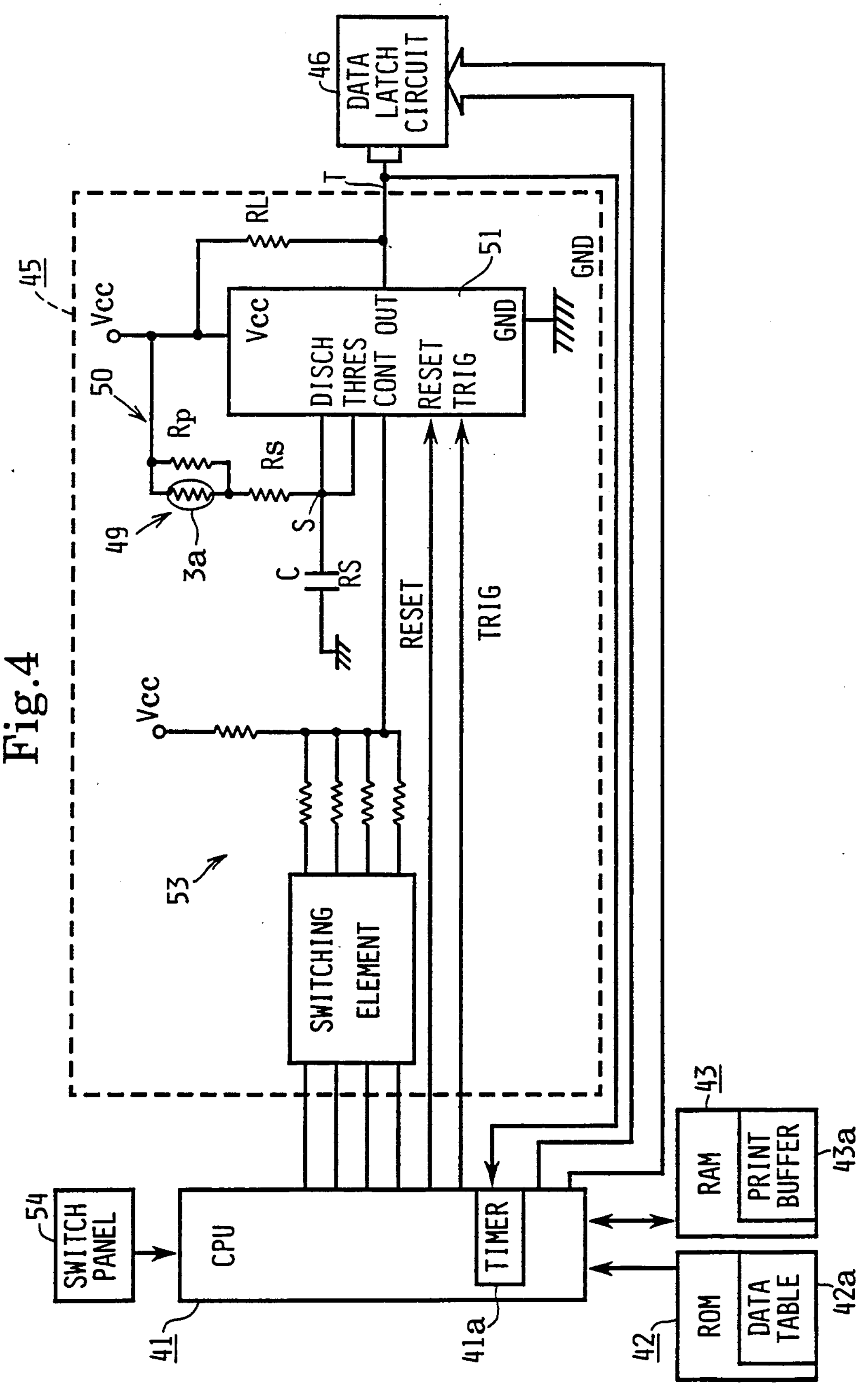
FIG. 4 is a circuit diagram of part of the control circuitry of the preferred embodiment.
Figure 5:
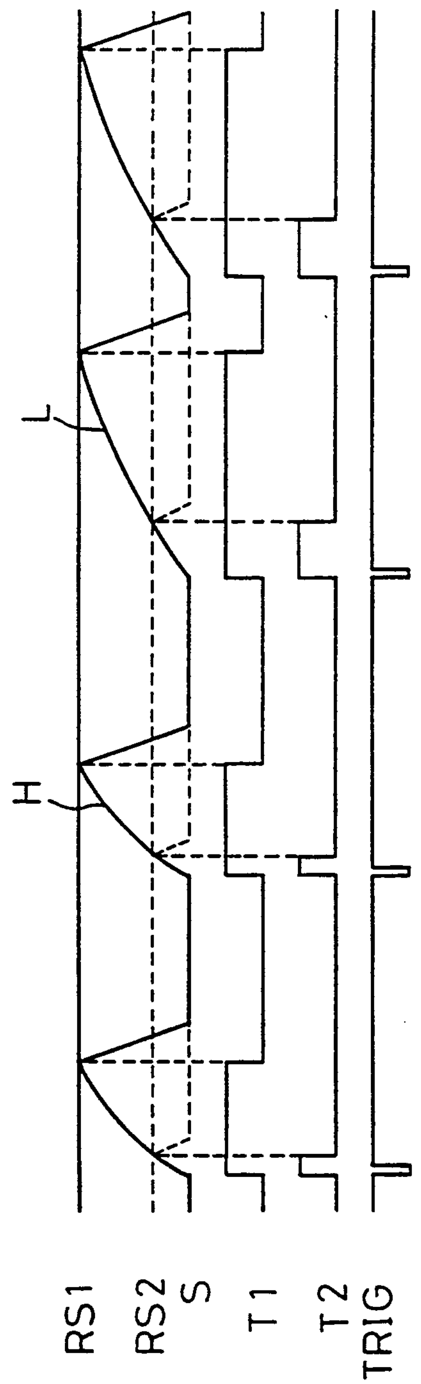
FIG. 5 is a timing chart of signals for use with the preferred embodiment.

As depicted in FIG. 4, the temperature compensation circuit comprises an RC charging-discharging circuit 49 and an output circuit 50. The RC charging-discharging circuit 49 outputs signals of different charging-discharging output waveforms in response to varying temperatures. The output circuit 50 admits the output signal from the charging-discharging circuit 49 along with a reference signal in order to furnish an output signal accordingly. In this embodiment, the output circuit 50 is implemented using a general-purpose IC (product name: NE555) 51. This IC is capable of functioning as a monostable multivibrator. A CONT (control) terminal of the IC 51 admits a reference signal RS. Resistors Rp and Rs as well as a capacitor C are attached to DISCH (discharge) and a THRES (threshold) terminal of the IC 51. Also provided is the thermistor 3*a* disposed in parallel with the resistor Rp to make up the RC charging-discharging circuit 49, whereby the waveform of a charging-discharging signal S from the RC charging-discharging circuit 49 is varied in accordance with the temperature of the thermal head 3. Since the thermistor 3*a* is located on the thermal head 3, the resistance value of the thermistor varies with temperature changes in the head 3. That is, the thermistor 3*a* becomes less resistant at higher temperatures and more resistant at lower temperatures. It follows that the time constant of the RC charging-discharging waveform is smaller at higher temperatures and larger at lower temperatures. Thus the output signal S from the RC charging-discharging circuit 49 takes a waveform H at higher temperatures and waveform L at lower temperatures as shown in FIG. 5.

The reference signal generation circuit that generates the reference signal RS comprises the CPU 41; a digital-analog converter (D/A) 53; and the data table 42*a* which stores plural digital reference information. The D/A 53 comprises switching elements, resistances and a voltage source. The CPU 41 extracts the appropriate digital reference information from the data table 42*a* and outputs the extracted digital reference information to the D/A 53. The D/A 53 converts the digital reference information to analog format and outputs the analog signal as the reference signal RS.

A time interval occurs from the time the RC charging-discharging circuit 49 begins its charging operation until the voltage of the charging-discharging signal S from the circuit 49 reaches a threshold voltage indicated by a reference signal RS1 or RS2 coming from the D/A 53. This time interval becomes the pulse duration for an output signal T1 or T2 furnished by the output circuit 50.

When a Low signal is inputted to a RESET terminal of the IC 51, the electric charge in the capacitor C of the RC charging-discharging circuit 49 flows into the DISCH (discharge) terminal thereof. With the circuit 49 discharged, an OUT (output) terminal of the IC 51 is brought low. When a trigger pulse (TRIG) is inputted to a TRIG (trigger) terminal of the IC 51, the DISCH terminal is shut down. A voltage Vcc then starts charging the RC charging-discharging circuit 49, and the OUT terminal is brought high. This raises the temperature compensation signal T. The high level of the signal T is generated by pulling it up with the voltage Vcc via a resistor RL.

The RC charging-discharging circuit 49 is charged over time. Thus the voltage of the charging-discharging signal S is raised, as shown in FIG. 5, in accordance with the time constant determined based on the resistance value which in turn is currently determined by the resistors Rp and Rs, capacitor C and thermistor 3*a*. When the voltage of the charging-discharging signal S which is admitted to the THRES (threshold) terminal reaches the threshold voltage indicated by the reference signal RS admitted to the CONT (control) terminal of the IC 51. The OUT terminal is brought low and the DISCH terminal is allowed to conduct, thereby causing the RC charging-discharging circuit 49 to start discharging. In this manner, the voltage of the charging-discharging signal S is lowered, as depicted in FIG. 5, in accordance with the time constant of the RC charging-discharging circuit 49. In FIG. 5, where the reference signal is RS1, the manner in which the charging-discharging signal S is raised is indicated by solid line; the manner in which the signal S is lowered when the reference signal is RS2 is illustrated by the broken line.

The time in which the temperature compensation signal T remains high becomes equal to the duration from the time the RC charging-discharging circuit 49 begins its charging operation until the voltage of the charging-discharging signal S reaches the threshold voltage indicated by the reference signal RS. Therefore, as shown in FIG. 5, a temperature compensation signal T1 for the high-voltage reference signal RS1 involves pulses of longer duration than a temperature compensation signal T2 for the low-voltage reference signal RS2 even though the resistance of thermistor 3*a* (and the temperature of the thermal head 3) is the same.

When the next trigger signal is inputted to the TRIG terminal, the same process as described above takes place, causing the next temperature compensation signal T to be outputted to the OUT terminal.

As described, the time constant of the RC charging-discharging circuit 49 is smaller when the thermal head 3 bears a high temperature and the thermistor 3*a* has a low resistance value than when the thermal head 3 has a low temperature and the thermistor 3*a* has a high resistance value. In this case, as shown in FIG. 5, the waveform H of the charging-discharging signal S has a steeper leading edge gradient than the waveform L thereof which occurs when the temperature is low. Thus, regardless of whether the reference signal is RS1 or RS2, the pulse duration of the temperature compensation signal T becomes shorter at higher temperatures.

In the present embodiment, the temperature of the thermal head 3 detected by the thermistor 3*a* and the digital reference information furnished by the CPU 41 for control of the reference signal RS are thus used to control the temperature compensation signal T in terms of pulse duration optimally and precisely. The output circuit 50 outputs the temperature compensation signal T to the data latch circuit 46. In turn, the data latch circuit 46 outputs a corresponding signal to the head driving circuit 47. Based on the temperature compensation signal T, the heating elements Ha through Hz are heated by the head driving circuit 47.

The following is a description of how the CPU 41, part of the digital means, controls the voltage of the reference signal RS. In this control setup, the present invention addresses and solves a number of problems.

A first problem involves cases where the thermistor 3*a* may not be fully capable of compensating for the head temperature sufficiently. In general, when control over temperature detection by the thermistor 3*a* is in effect, the signal generated by the temperature compensation circuit is of shorter duration at higher temperatures and of longer duration at lower temperatures. However, recording may still not be as stable as desired. In particular, at high thermal head temperatures the time constant of the RC charging-discharging circuit is not adequately reduced. In other words, the resistance of thermistor 3*a* does not decrease enough to adequately reduce the charging time of the RC charging-discharging circuit and, thus, the duration of the temperature compensation signal T is still too long. One solution to this problem of instability is to switch a first reference signal to a second reference signal having a lower voltage level than that of the first reference signal, when the temperature of the thermal head 3 rises to a predetermined temperature or higher. This solution is implemented by use of the data table 42*a* that stores two different digital reference information corresponding to the first and second reference signal, respectively. CPU 41 can determine whether the temperature of the thermal head 3 reaches the predetermined temperature, by checking the duration of the temperature compensation signal T. Namely, CPU 41 determines that the temperature of the thermal head 3 is higher than the predetermined temperature when the duration of the signal T is determined to be less than or equal to a duration corresponding to the predetermined temperature. In this manner, CPU 41 extracts the digital reference information corresponding to the second reference signal from the data table 42*a*.

A second problem occurs when the thermal recording apparatus is used in, for example, a facsimile receiver. In such a situation, differences in communication time translate into different line speeds which in turn may produce an irregular thickness distribution of printed information. For example, when a communication time differential alters recording periods, i.e., the time required to set data to the data latch circuit 46, if the pulse duration is the same, the data with a longer recording period is printed thinner due to the radiation effect (heat loss) of the thermal head 3. In other words, if long periods of time occur between printing consecutive lines on a recording medium, an excessive amount of heat will be radiated away from thermal head 3 prior to the printing of the next line resulting in print which is too thin. To detect such a situation, CPU 41 includes a timer 41*a*. Timer 41*a* is electrically connected with the temperature compensation signal T provided by output circuit 50 and therefore can monitor the time between consecutive printing operations. In particular, timer 41*a* begins counting when signal T becomes low (see FIG. 5) and stops counting when CPU 41 supplies the print data stored in the print buffer 43*a* to the data latch circuit 46 in order to print the next line. Based upon the duration of the low signal T, CPU 41 selects an appropriate digital reference information from data table 42*a*.

A third problem addressed by the present invention involves varying the reference signal to accommodate thermal heads having different resistance characteristics. Thermal heads 3 are provided having different ranks (i.e. rank A, rank B, etc.). Each rank can have a different average heating resistor resistance. Thermal heads having different average resistances should optimally be provided with different temperature compensation signals. The present invention includes a switch panel 54 by which an operator can enter the rank of the thermal head enabling CPU 41 to select an appropriate digital reference information for that thermal head from data table 42*a*.

In this manner, reference information stored in data tables 42*a* is selected by the CPU 41 to automatically or manually vary the reference signal voltage level. This arrangement makes it possible to easily provide complex and accurate control over any irregularity that may occur in recording thickness and that may be attributable to thermistor temperature changes, line-by-line recording discrepancies or heating element resistance dispersion. It is also easy to modify control parameters for different control setups.

In the above-described preferred embodiment, a thermistor is used as the temperature detection element. Alternatively, any other suitable element may be used to replace the thermistor. Additionally, while the illustrated embodiment is a line-by-line printer, the present invention is also applicable to serial printers such as dot matrix printers and character-by-character printers.

What is claimed:

1. A thermal recording apparatus for recording images on a recording medium by using heat comprising:

a thermal head including heat-generating means for producing heat to record images on the recording medium;

head driving means, electrically connected to said heat-generating means, for driving said heat-generating means to produce heat according to the images to be recorded; and temperature compensation means, electrically connected to said head driving means, for controlling a temperature of said thermal head, said temperature compensation means including temperature detecting means, operatively associated with said thermal head, for detecting a temperature of said thermal head and outputting a temperature signal, and reference information generating means, operatively associated with said temperature detecting means, for generating and outputting a reference signal having a variable value, said temperature compensation means controlling the temperature of said thermal head by comparing the temperature signal output by said temperature detecting means with the reference signal generated by said reference information generating means and outputting a compensation signal to said head driving means, wherein a value of said compensation signal can vary at a constant thermal head temperature based on the value of said reference signal.

2. The apparatus according to claim 1, wherein said temperature detecting means includes a thermistor mounted on said thermal head and having a variable resistance which varies according to a temperature of said thermal head.

3. The apparatus according to claim 1, wherein said compensation signal is in the form of a pulse having a duration.

4. The apparatus according to claim 3, wherein said temperature detecting means includes a temperature detecting circuit having a capacitance and said temperature signal is in the form of a wave equal to a charging voltage of said capacitance.

5. The apparatus according to claim 4, wherein said reference signal represents a voltage and said duration of said pulse outputted by said temperature compensation means is equal to a time required for said charging voltage to rise from zero to the value of said reference signal.

6. The apparatus according to claim 1, wherein said reference information generating means includes digital means for outputting a digital reference information signal and a digital-to-analog converter, electrically connected to said digital means, for converting said digital reference information signal to said reference signal, said reference signal being in analog form.

7. The apparatus according to claim 3, wherein said temperature compensation means includes an output circuit, electrically connected to said temperature detecting means, said reference information generating means, and said head driving means, for comparing said temperature signal and said reference signal and for outputting said compensation signal to said head driving means.

8. The apparatus according to claim 5, wherein said temperature compensation means includes an output circuit, electrically connected to said temperature detecting means, said reference information generating means, and said head driving means, for comparing said temperature signal and said reference signal and for outputting said compensation signal to said head driving means.

9. The apparatus according to claim 8, wherein said temperature compensation means includes a microprocessor.

10. The apparatus according to claim 9, wherein said temperature compensation means also includes an integrated chip, and said microprocessor supplies said integrated chip with a charge signal, and said integrated chip stops discharging said capacitance upon receipt of said charge signal.

11. The apparatus according to claim 10, wherein said reference information generating means includes digital means for outputting a digital reference information signal and a digital-to-analog converter, electrically connected to said digital means, for converting said digital reference information signal to said reference signal, said reference signal being in analog form.

12. The apparatus according to claim 11, wherein said microprocessor supplies said digital reference information signal to said digital-to-analog converter.

13. A thermal recording apparatus for recording images on a recording medium by using heat comprising:

a thermal head including heat-generating means for producing heat to record images on the recording medium;

head driving means, electrically connected to said heat-generating means, for driving said heat-generating means to produce heat according to the images to be recorded; and temperature compensation means, electrically connected to said head driving means, and including an RC charging-discharging circuit having a thermistor resistant element mounted on said thermal head and having a variable resistance which varies according to a temperature of said thermal head, said RC charging-discharging circuit outputting a signal having a waveform which varies in response to the temperature of said thermal head, a digital means for outputting a digital reference information signal having a variable value based on a condition of said thermal recording apparatus, a digital-to-analog converter, electrically connected to said digital means, for converting the digital reference information signal to an analog reference information signal having a variable value which varies with the value of said digital reference information signal, and an output circuit, electrically connected to said RC charging-discharging circuit and to said digital-to-analog converter, for outputting a temperature compensation signal based upon a charging time required for said RC charging-discharging circuit to reach a charged level from a discharged level, said charged level being determined by the value of said analog reference information signal, said charging time being determined by comparing the output waveform of said charging-discharging circuit with said analog reference information signal, wherein a value of said temperature compensation signal can vary at a constant thermal head temperature based on the value of said analog reference information signal.

14. A thermal recording apparatus for recording images on a recording medium by using heat comprising:

a thermal head including heat-generating means for producing heat to record images on the recording medium;

head driving means, electrically connected to said heat-generating means, for driving said heat-generating means to produce heat according to the images to be recorded; and temperature compensation means, electrically connected to said head driving means, for controlling an operation of said head driving means to control a temperature of said thermal head, said temperature compensation means including temperature detecting means for generating a temperature signal based upon a temperature of said thermal head, means for generating a condition signal having a variable value based upon a condition of said thermal recording apparatus and storage means, electrically connected to said means for generating a condition signal and to said temperature detecting means, for storing reference information signals corresponding to the variable values of the condition signal generated by said means for generating a condition signal, wherein said temperature compensation means extracts a reference information signal from said storage means based on the value of said condition signal generated by said means for generating a condition signal and controls the temperature of said thermal head by comparing said temperature signal with said reference information signal and outputting a compensation signal to said head driving means, wherein a value of said compensation signal can vary at a constant thermal head temperature based on the value of said reference information signal.

15. The apparatus according to claim 14, wherein said means for generating a condition signal is a manually actuatable switch.

16. The apparatus according to claim 14, wherein said means for generating a condition signal is a microprocessor which includes means for automatically sensing a condition of said thermal recording apparatus.

17. The apparatus according to claim 16, wherein said means for automatically sensing a condition senses whether the temperature of said thermal head is higher than a predetermined temperature.

18. The apparatus according to claim 16, wherein said means for automatically sensing a condition senses a time period between consecutive printing operations of said thermal head.

* * * * *